United States Patent
Cimadamore et al.

(10) Patent No.: US 11,543,976 B2
(45) Date of Patent: Jan. 3, 2023

(54) METHODS FOR REDUCING UNSAFE MEMORY ACCESS WHEN INTERACTING WITH NATIVE LIBRARIES

(71) Applicant: Oracle International Corporation, Redwood Shores, CA (US)

(72) Inventors: Maurizio Cimadamore, Donabate (IE); James Malcolm Laskey, Lunenburg (CA); Jorn Bender Vernee, Leiden (NL); Vladimir Vitalyevich Ivanov, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/201,388

(22) Filed: Mar. 15, 2021

(65) Prior Publication Data
US 2021/0311628 A1    Oct. 7, 2021

Related U.S. Application Data

(60) Provisional application No. 63/003,556, filed on Apr. 1, 2020.

(51) Int. Cl.
*G06F 3/06* (2006.01)

(52) U.S. Cl.
CPC ............ *G06F 3/062* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883;
(Continued)

(56) References Cited

U.S. PATENT DOCUMENTS

| | | | | |
|---|---|---|---|---|
| 5,319,760 A | * | 6/1994 | Mason ................ | G06F 12/1054 |
| | | | | 711/6 |
| 5,537,592 A | * | 7/1996 | King .................... | G06F 16/258 |
| | | | | 707/823 |

(Continued)

OTHER PUBLICATIONS

M. Cesati, R. Mancuso, E. Betti and M. Caccamo, "A Memory Access Detection Methodology for Accurate Workload Characterization," 2015 IEEE 21st International Conference on Embedded and Real-Time Computing Systems and Applications, 2015, pp. 141-148, doi: 10.1109/RTCSA.2015.30. (Year: 2015).*

(Continued)

*Primary Examiner* — Daniel C. Chappell
(74) *Attorney, Agent, or Firm* — Invoke

(57) ABSTRACT

Techniques for reducing unsafe memory access, particularly when interacting with native libraries, are disclosed. The system may receive a memory address. The system may determine that the received memory address is not associated with an existing memory segment. The system selects a particular memory segment, of a plurality of memory segments. The memory segment may have a length of zero and a size corresponding to a size of a native heap. The system may return a reference to the particular memory segment.

27 Claims, 7 Drawing Sheets

(58) Field of Classification Search
CPC ............. G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | | |
|---|---|---|---|---|---|
| 5,946,713 | A * | 8/1999 | Hacking | | G06F 12/0802 |
| | | | | | 711/2 |
| 5,991,856 | A * | 11/1999 | Spilo | | G06F 11/0793 |
| | | | | | 711/147 |
| 6,066,181 | A * | 5/2000 | DeMaster | | G06F 8/51 |
| | | | | | 717/148 |
| 6,237,110 | B1 * | 5/2001 | Lin | | G06F 12/0246 |
| | | | | | 714/6.32 |
| 6,446,034 | B1 * | 9/2002 | Egolf | | G06F 9/45554 |
| | | | | | 711/208 |
| 7,882,319 | B2 * | 2/2011 | Johnson | | G06F 12/023 |
| | | | | | 711/170 |
| 8,200,938 | B2 * | 6/2012 | Czajkowski | | G06F 9/544 |
| | | | | | 711/6 |
| 8,209,510 | B1 * | 6/2012 | Thathapudi | | G06F 21/60 |
| | | | | | 711/171 |
| 11,221,951 | B1 * | 1/2022 | Abhishek Raja | | G06F 3/0622 |
| 2002/0144077 | A1 * | 10/2002 | Andersson | | G06F 12/145 |
| | | | | | 711/E12.102 |
| 2002/0147916 | A1 * | 10/2002 | Strongin | | G06F 12/1483 |
| | | | | | 713/193 |
| 2003/0126398 | A1 * | 7/2003 | Shinozaki | | G06V 20/64 |
| | | | | | 711/163 |
| 2006/0195626 | A1 * | 8/2006 | Arndt | | G06F 12/0653 |
| | | | | | 710/10 |
| 2007/0005911 | A1 * | 1/2007 | Yang | | G06F 12/08 |
| | | | | | 711/202 |
| 2007/0288682 | A1 * | 12/2007 | Czajkowski | | G06F 9/544 |
| | | | | | 711/2 |
| 2008/0046997 | A1 * | 2/2008 | Wang | | G06F 21/79 |
| | | | | | 726/16 |
| 2008/0209578 | A1 * | 8/2008 | Ghetie | | G06F 21/79 |
| | | | | | 726/30 |
| 2009/0089531 | A1 * | 4/2009 | Johnson | | G06F 12/023 |
| | | | | | 711/170 |
| 2012/0047343 | A1 * | 2/2012 | Farrell | | G06F 11/0712 |
| | | | | | 711/164 |
| 2012/0210095 | A1 * | 8/2012 | Nellans | | G06F 12/1072 |
| | | | | | 711/E12.059 |
| 2012/0233378 | A1 * | 9/2012 | Elteto | | G06F 9/45558 |
| | | | | | 711/6 |
| 2013/0132698 | A1 * | 5/2013 | Huang | | G06F 3/0611 |
| | | | | | 711/170 |
| 2014/0033304 | A1 * | 1/2014 | Lewis | | G06F 21/53 |
| | | | | | 726/22 |
| 2014/0075136 | A1 * | 3/2014 | Davies | | G06F 21/6227 |
| | | | | | 711/E12.07 |
| 2015/0006962 | A1 * | 1/2015 | Swanson | | G06F 11/0724 |
| | | | | | 714/38.11 |
| 2015/0089178 | A1 * | 3/2015 | Furdui | | G06F 12/023 |
| | | | | | 711/165 |
| 2015/0149592 | A1 * | 5/2015 | Gibbon | | H04N 21/472 |
| | | | | | 709/219 |
| 2016/0085687 | A1 * | 3/2016 | Baruch | | G06F 12/1009 |
| | | | | | 711/147 |
| 2016/0274792 | A1 * | 9/2016 | Ogawa | | G06F 3/061 |
| 2017/0115975 | A1 * | 4/2017 | Rose | | G06F 9/4484 |
| 2017/0116017 | A1 * | 4/2017 | Rose | | G06F 9/44521 |
| 2020/0409734 | A1 * | 12/2020 | Sahita | | G06F 9/45533 |
| 2021/0334019 | A1 * | 10/2021 | Grisenthwaite | | G06F 3/0655 |

OTHER PUBLICATIONS

B. Wong, G. Czajkowski and L. Daynes, "Dynamically loaded classes as shared libraries: an approach to improving virtual machine scalability," Proceedings International Parallel and Distributed Processing Symposium, 2003, pp. 10 pp. -, doi: 10.1109/IPDPS.2003. 1213123. (Year: 2003).*

J. Roney, T. Appel, P. Pinisetti and J. Mickens, "Identifying Valuable Pointers in Heap Data," 2021 IEEE Security and Privacy Workshops (SPW), 2021, pp. 373-382, doi: 10.1109/SPW53761.2021.00057. (Year: 2021).*

Application Binary Interface, Wikipedia, 2017, 4 pages, [retrieved on Feb. 12, 2022], Retrieved from the Internet: <URL:https://web. archive.org/web/20170307083910/https://en.wiki pedia.org/wiki/ Application_binary_interface>.

Java Native Interface, Wikipedia, 2017, 5 pages, [retrieved on Feb. 12, 2022], Retrieved from the Internet: <URL:https://web.archive. org/web/20170325020302/https://en.wiki pedia.org/wiki/Java_Native_ Interface>.

Thalinger, C., et al., Optimizing Invokedynamic, PPPJ '10: Proceedings of the 8th International Conference on the Principles and Practice of Programming in Java, Sep. 2010, pp. 1-9, [retrieved on Feb. 12, 2022], Retrieved from the Internet: <URL:http://dl.acm. org/>.

* cited by examiner

METHODS FOR REDUCING UNSAFE MEMORY ACCESS WHEN INTERACTING WITH NATIVE LIBRARIES

INCORPORATION BY REFERENCE; DISCLAIMER

This application is hereby incorporated by reference: application no. 63/003,556 filed on Apr. 1, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to accessing memory. In particular, the present disclosure relates to mitigating risks of accessing memory addresses received from foreign code by reducing a number of memory accesses to unknown memory segments.

BACKGROUND

Interacting with native libraries can pose a great challenge to runtime safety of a Java program. For example, a native library can return a memory address to a Java application. The memory address returned by the native library is associated with a memory segment allocated inside native code. Accordingly, the Java runtime environment has no information about the spatial and/or temporal bounds of the memory segment. It is therefore possible for the Java client to perform a dereference operation in an attempt to access contents of the returned memory address, resulting in either accessing an out-of-bounds memory location or accessing a memory location that has been deallocated. Such a dereference operation can be detrimental to the functioning of the Java virtual machine.

Additionally, an application may need to create a constant memory address of a specific value. For example, such a memory address may be required when interacting with a legacy native library that uses known memory addresses as sentinel values for exchanging information. In such cases, these memory addresses are not intended to be dereferenced by the user. That is, the contents of the memory located at the address specified are not intended to be accessed. Rather, the address is intended to be used directly. Accordingly, it can be desirable to prevent dereferencing of these addresses, to reinforce the fact that contents of the memory at these addresses are not intended to be accessed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
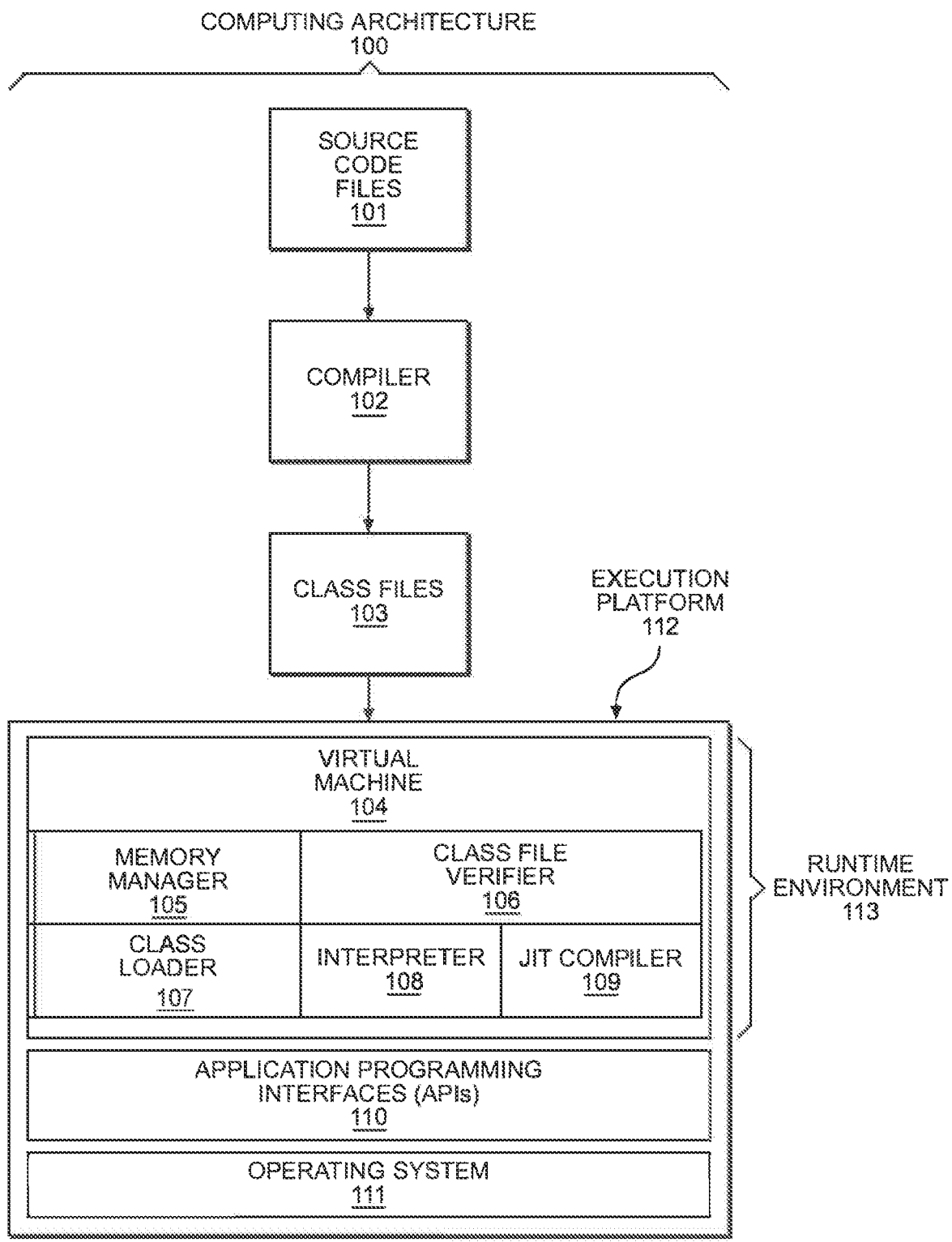
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MEMORY ACCESS API
4. EVERYTHING SEGMENT
5. WORKING WITH A MEMORY ADDRESS
6. ASSOCIATING A MEMORY ADDRESS WITH A MEMORY SEGMENT
7. DEREFERENCING A MEMORY ADDRESS USING RESTRICTED OPERATIONS
8. MISCELLANEOUS; EXTENSIONS
9. HARDWARE OVERVIEW

1. GENERAL OVERVIEW

One or more embodiments include methods for reducing unsafe memory access by an application. In particular, a system may use a memory access Application Programming Interface (API) to limit access to memory addresses that are not associated with memory segments which the application has information about.

One or more embodiments configure and provide access to memory based on instructions received via an Application Programming Interface (API). The system may receive instructions, via the API, to operate on multiple foreign memory sources, including native memory, persistent memory, managed heap memory, etc.

A memory segment may be accessed using a memory segment view. A memory segment view creates a view over a contiguous memory segment. The memory segment view may be an object (e.g., a MemorySegment object) including particular spatial and temporal bounds. The memory segment view may specify spatial bounds of a memory segment (e.g. as the base address and a segment length (e.g., a number of bytes), which act as the segment bounds). The memory segment view may specify temporal bounds of the memory segment (e.g., that the memory segment is created, used and then closed (e.g., de-allocated) when no longer in use). An example implementation of temporal bounds for a memory segment view may be a boolean value that is used to track whether the segment can be used (e.g., accessed), or whether the segment has been closed. In embodiments, the API may require a memory segment view for dereferencing a memory address associated with a particular memory segment. The memory segment view may include a reference to the particular memory address to be accessed. For example, the reference may be an offset to the particular memory address, relative to the base address of the memory segment.

The system may use an everything segment for situations where a memory address is not associated with any particular memory segment and the memory address needs to be accessed (dereferenced). The everything segment may have a length corresponding to a size of the native heap. This length ensures that all memory addresses obtained from the everything segment are, by definition, within the spatial bounds, and therefore may be dereferenced using the memory access API. A base address of the everything segment may be set to zero. Using this base address is convenient because the value zero is commonly used as NULL in certain programming languages, such as C and C++.

In an embodiment, the system receives a memory address. The memory address can represent a physical location within the system memory. The received memory address may not be associated with any memory segment known to the virtual machine. Accordingly, the system may create a memory segment view that associates the memory address with a memory segment. The memory segment view for the received memory address may reference the everything segment.

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
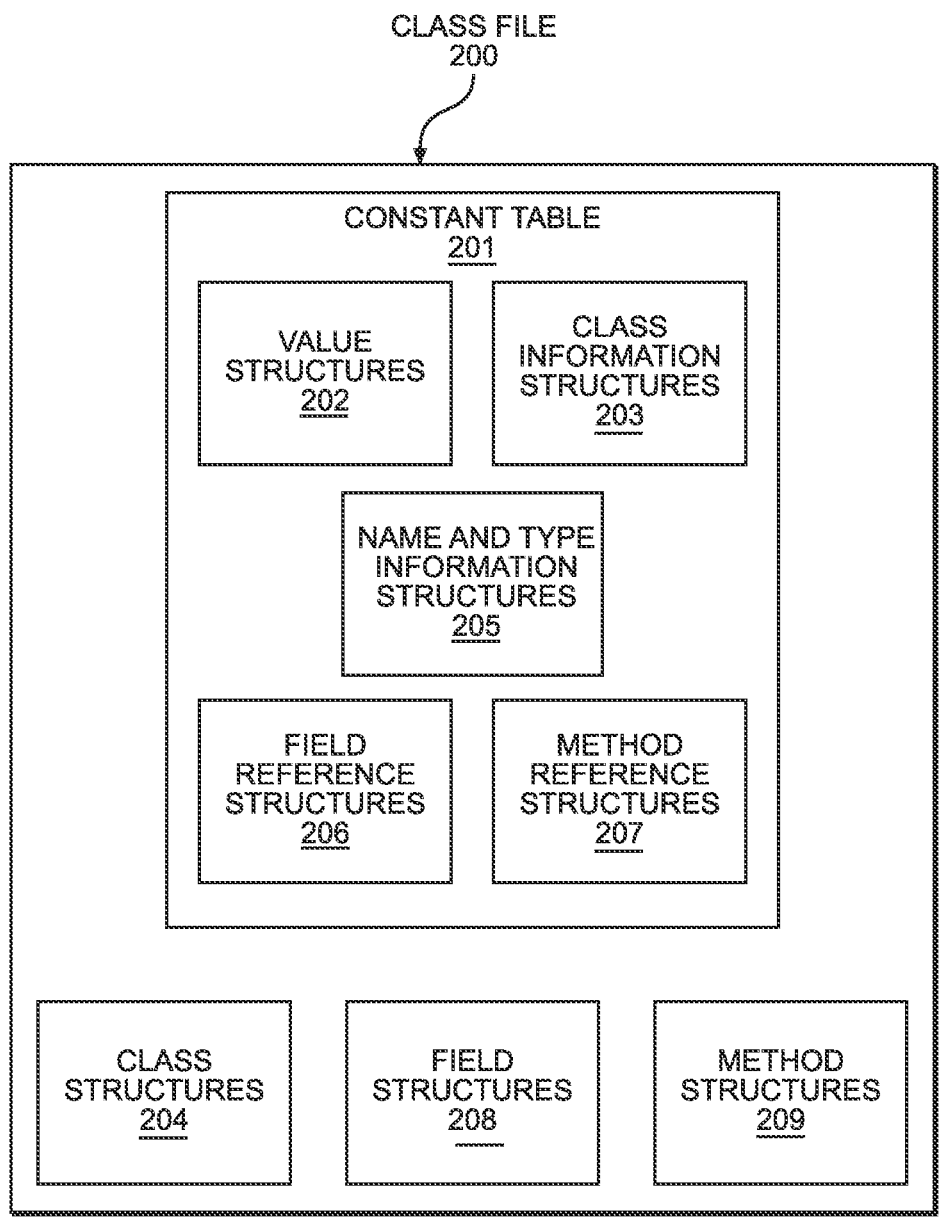
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

---

```
class A
{
    int add12and13( ) {
        return B.addTwo(12, 13);
    }
}
```
---

In the above example, the Java method add12 and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
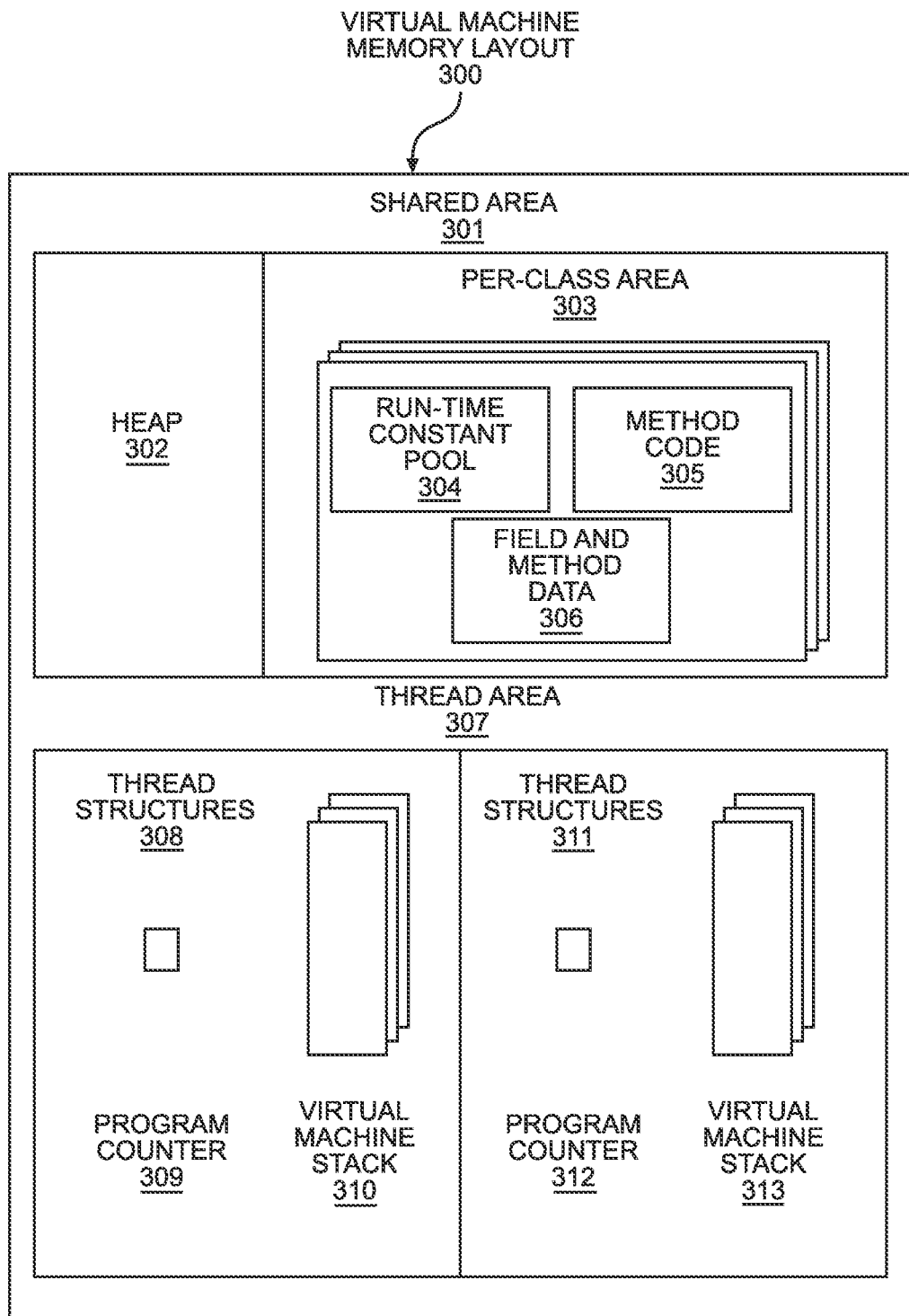
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
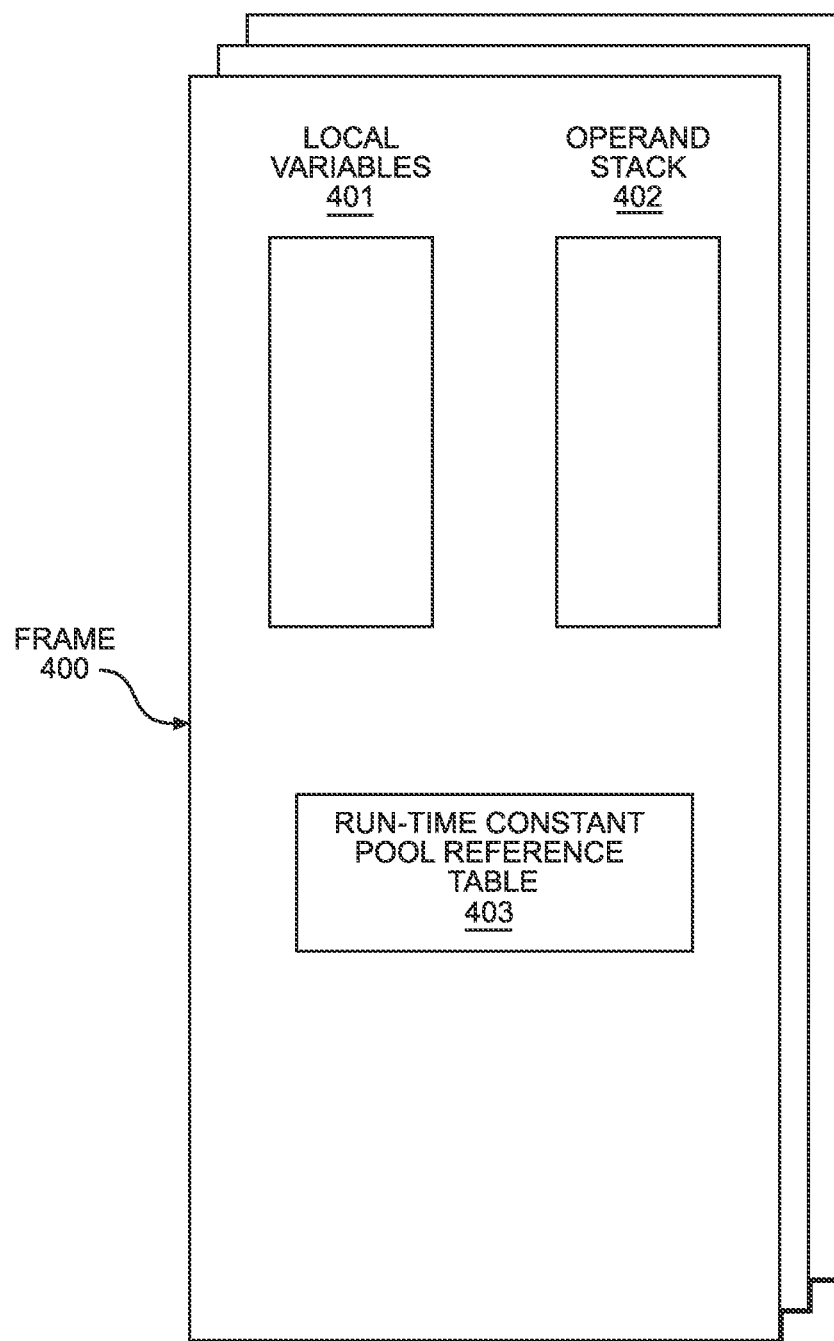
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. MEMORY ACCESS API

The memory access API allows for safe and efficient access of memory, particularly of foreign memory outside of the Java heap. In particular, the memory access API introduces abstractions for a memory segment (e.g., a memory segment view) and a memory address (e.g., a memory address view), among other things.

A memory segment view creates a view over a contiguous memory segment. The memory segment view includes particular spatial and temporal bounds. The memory segment view may specify spatial bounds of a memory segment (e.g. a base address and an upper bound, or a base address and a length). Any attempt to use the segment view to access memory outside of the spatial bounds will result in an exception. The memory segment view may also specify temporal bounds of the memory segment (e.g., that the memory segment is created, used and then closed (e.g., de-allocated) when no longer in use). Any attempt to access an already-closed memory segment view will result in an exception. A memory segment view may further include a reference to a particular physical memory address within the memory segment. Together, spatial and temporal safety checks are important to improving the safety of the memory access API by, for example, avoiding hard crashes in the system.

A memory address view represents a particular address within a memory segment. The memory address view may include an offset that specifies a memory address with reference to the base address of a memory segment. A memory address view may also specify a reference to the memory segment view it refers to.

In embodiments, the memory access API may require a memory segment view to dereference memory. That is, a memory dereferencing operation may include, as parameters, at least temporal bounds and spatial bounds associated with the memory segment that includes a memory address to be dereferenced, in addition to the memory address to be dereferenced.

4. EVERYTHING SEGMENT

An everything segment may be a particular memory segment used for helping to allow dereferencing of memory when only a memory address (e.g., not a memory segment) is passed from a function. The everything segment may be a primordial segment which covers the entire native heap. In embodiments, the everything segment is defined to have a base address selected to be a memory address identified as NULL in one or more programming languages. In other embodiments, a base address of the everything segment can be the lowest addressable memory address in the native heap.

An everything segment view may be a memory segment view that represents the everything segment. To represent the everything segment, the everything segment view specifies that the everything segment has a length equal to the size of the native heap. This length ensures that any offset based on the everything segment is within the spatial bounds of the everything segment view. Accordingly, dereferencing any memory address view that references the everything segment will result in a successful dereferencing. The everything segment view records the base address of the everything segment. In embodiments, the everything segment view does not include an owner. Accordingly, the everything segment is always alive (e.g., the temporal bounds of the everything segment extend indefinitely) and cannot be closed by the user. Since this segment is available as a constant, dereference can happen without the need of creating any additional segment instances:

5. WORKING WITH A MEMORY ADDRESS

The system may receive a memory address. The received memory address may comprise a raw physical memory address representing a particular storage location in system memory (e.g., not a memory address view). The raw physical memory address may be represented as a primitive data type, such as a 'long' value.

In some embodiments, the raw physical address is received as a return value from a foreign function. For example, a Java application may receive a memory address as a return value when executing a native function. In other embodiments, the raw physical address is received by reading data from a native data structure. That is, the raw physical address may be the result of interaction with foreign code.

In still other aspects, the raw physical address is received by a user creating a specific memory address. That is, some native libraries use specific memory addresses as constants to signal particular conditions. In these cases, the memory address is not used to access a particular location in system memory. Rather, the memory address serves as a numeric constant.

In some embodiments, the system may require the contents of the memory located at the received memory address. Accordingly, the system accesses (dereferences) the memory address to perform one or more actions on the contents of the memory address. Alternatively, There are uses for a memory address that do not require dereferencing the memory address.

One example use for the memory address that does not require dereferencing is that the memory address may be used as a constant value. That is, some native libraries use specific memory addresses as constants to signal particular conditions (e.g., as a sentinel value). In these cases, the memory address is not used to denote a particular memory location; rather, the memory address functions as a numeric constant.

Another example use for the memory address that does not require dereferencing is that the memory address may also be used as an opaque pointer. That is, the memory address may be used to pass the memory address to other functions. In particular, the memory address may be used to pass the memory address to a native function that may be able to make use of the memory address.

6. ASSOCIATING A MEMORY ADDRESS WITH A MEMORY SEGMENT

Figure 5:
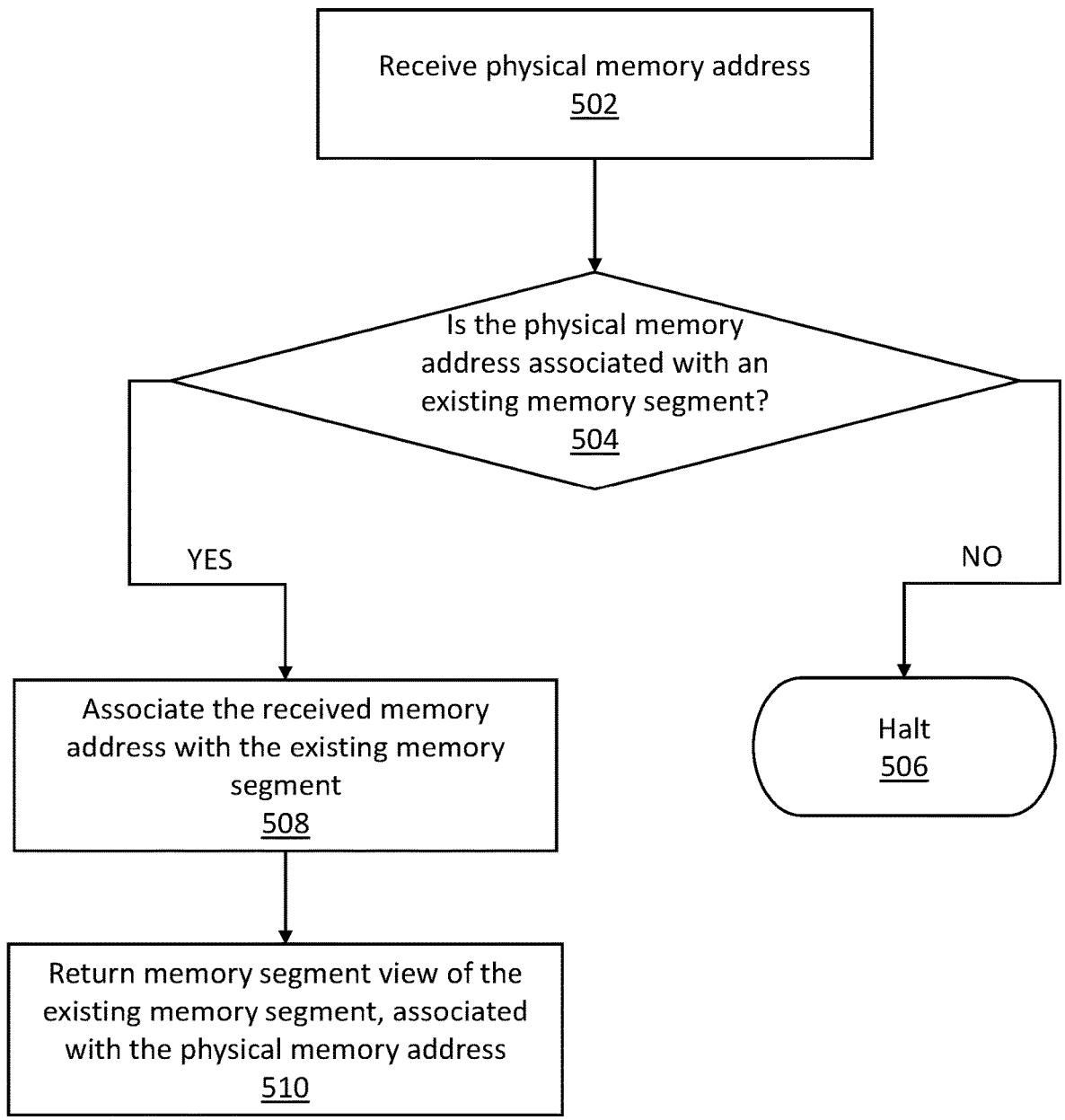
FIG. 5 illustrates a set of operations for associating a memory address with a memory segment, in accordance with one or more embodiments.

FIG. 5 illustrates a flowchart showing operations for associating a memory address with a memory segment to permit dereference operations using safe (e.g., unrestricted) operations. This may allow a user to dereference a memory address that is received without performing any operations that could potentially jeopardize the operation of the system. One or more operations illustrated in FIG. 5 may be modified, rearranged, or omitted all together. Accordingly, the particular sequence of operations illustrated in FIG. 5 should not be construed as limiting the scope of one or more embodiments.

The system may receive a memory address (Operation 502). The received memory address may comprise a raw physical memory address representing a particular storage location in system memory. The raw physical memory address may be represented as a primitive data type, such as a 'long' value.

In some embodiments, the raw physical address is received as a return value from a foreign function. For example, a Java application may receive a memory address as a return value when executing a native function. In other embodiments, the raw physical address is received by reading data from a native data structure. That is, the raw physical address may be the result of interaction with foreign code.

In still other aspects, the raw physical address is received by a user creating a specific memory address. That is, some native libraries use specific memory addresses as constants to signal particular conditions. In these cases, the memory address is not used to access a particular location in system memory. Rather, the memory address serves as a numeric constant.

In embodiments where the user wishes to dereference the memory address, the system may determine whether the received memory address is associated with an existing memory segment (Operation 504). In embodiments, when the received memory address is not a memory address view, the system determines that the received memory address is not associated with a memory segment. In some embodiments, the system may receive additional information with the memory address. In such embodiments, the system can determine that the memory address is associated with a memory segment based on the additional information. If the system determines that the physical memory address is not associated with an existing memory segment (NO in Operation 504), the system can halt, determining that the memory address cannot be associated with a memory segment using unrestricted (safe) operations (Operation 506).

In response to the system determining that the received memory address is associated with an existing memory segment (YES in Operation 504), the system may associate the received memory address with an existing memory segment (Operation 508). The system may select an existing memory segment with which to associate the memory address by, for example, prompting a user to select a memory segment (e.g., a memory segment having an associated memory segment view), from among a plurality of known safe memory segments. As an example, a native function may receive a memory address as a parameter, perform one or more operations on contents of memory located at the address, and return the same memory address as a return value. In this case, the system may know a memory segment corresponding to the memory address passed to the native function as a parameter. Thus, the system may be certain that the memory address received from the native function as a return value corresponds to the same memory segment as the memory address passed to the native function as a parameter.

To associate the memory address with the memory segment, the system may create a memory segment view associated with the memory segment. The memory segment view may include spatial bounds (e.g. a base address and an upper bound, or a base address and a length) and temporal bounds (e.g., that the memory segment is created, used and then closed (e.g., de-allocated) when no longer in use).

Additionally, the memory segment view may include an offset to the received memory address. To calculate the offset, the system may subtract the base address of the memory segment from the received physical memory address. In cases where the base address of the memory segment is zero or NULL, the system may store the received memory address as the offset.

The system may return a memory segment view associated with the memory address (Operation 510). As discussed above, the memory address is associated with the selected memory segment. Accordingly, the system may return the memory segment view that includes the offset to the memory address. Thus, any attempt to dereference the memory address using the memory segment view will be successful until the memory segment view is closed, permitting dereference of a memory address that would otherwise not be possible given the requirements of the memory access API.

7. DEREFERENCEING A MEMORY ADDRESS USING RESTRICTED OPERATIONS

Figure 6:
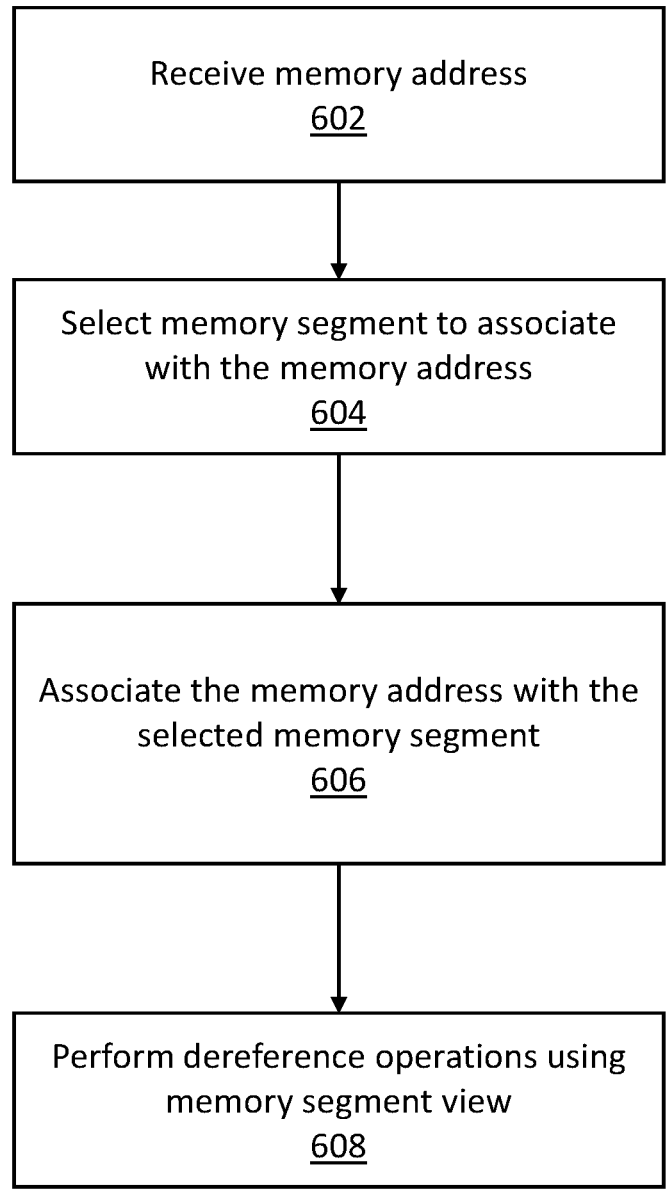
FIG. 6 illustrates a set of operations for dereferencing a memory address using restricted operations, in accordance with one or more embodiments.

FIG. 6 illustrates a flowchart showing operations for dereferencing a memory address that is not associated with a memory segment view using one or more restricted operations. One or more operations illustrated in FIG. 6 may be modified, rearranged, or omitted all together. Accordingly, the particular sequence of operations illustrated in FIG. 6 should not be construed as limiting the scope of one or more embodiments.

The system may receive a memory address (Operation 602). The received memory address may comprise a raw physical memory address representing a particular storage location in system memory (e.g., not a memory address view). The raw physical memory address may be represented as a primitive data type, such as a 'long' value.

In embodiments where the system determines that dereferencing the memory address is necessary, the system may select a memory segment with which to associate the memory address view (Operation 604). In some embodiments, selecting a memory segment may be performed in response to a determination that there is no existing memory segment with which the memory address is associated.

A first method for selecting the memory segment with which to associate the memory address may include a user creating a new memory segment and selecting the newly-created segment. That is, the user may have knowledge of the operations to be performed by the native function. For example, the user may be aware of a memory segment used by the native code as a persistent memory for returning large amounts of data. Accordingly, any call to a particular library that interfaces with the persistent memory will return a memory address that should be associated with the memory segment of the persistent memory. As another example, the user may be aware that the native function returns a memory address of a particular data structure, and can create a memory segment having a size corresponding to that data structure.

Creating the memory segment may include one or more unsafe operations. In particular, creating the memory segment may include creating a memory segment view to define the memory segment without altering the contents of the memory within the defined segment. In response to the user causing the one or more unsafe operations to be run, the system may provide an alert to users indicating that the operations are unsafe. For example, the system may produce an exception requiring the user to enter specific bypass or override information to allow the unsafe operations to be executed. For example, consider the following operations described using Java code:

```
MemoryAddress addr = ... //obtain address from native code
MemorySegment segment = addr.asSegmentRestricted(100);
int x = MemoryAccess.getInt(segment);
```

This code uses a restricted operation to create a memory segment having a base address equal to the memory address obtained from native code and a size of 100 bytes. The created memory segment is dereferenced to obtain an integer value. This operation is restricted (e.g., unsafe), because the system cannot confirm that the created memory segment view is an accurate representation of an existing memory segment.

Creating the memory segment view may include specifying a base address of the memory segment and a length (e.g., a number of bytes) of the memory segment. The base address of the memory segment may be selected to match the memory address received in Operation 602. The length may be selected depending on the needs of the user. In some embodiments, the length of the memory segment is selected to match the length of a particular data structure associated with the memory address. For example, if the memory address is associated with an array having ten elements of type 'long', the memory segment length can be calculated to be 80 bytes (e.g., ten times the length of a 'long'). In other embodiments, the length of the memory segment can be selected to be arbitrarily large. For example, the length of the memory segment can be selected such that substantially all memory is within bounds of the memory segment.

Alternatively, a second method for selecting a memory segment with which to associate the memory address may include selecting the everything segment. The everything segment covers the entire native heap. Since the everything segment is available as a constant, dereference can happen without the need of creating any additional segment instances.

The system may associate the memory address with the selected memory segment (Operation 606). Associating the memory address with the selected memory segment may include creating a memory segment view that associates the memory address with the memory segment. The memory segment view may include spatial bounds (e.g. a base address and an upper bound, or a base address and a length), temporal bounds (e.g., that the memory segment is created, used and then closed (e.g., de-allocated) when no longer in use), and a reference to the memory address. In some embodiments, determining the reference to the memory address may include calculating a new offset to the memory address that describes a location of the memory address in relation to a base address of the memory segment. To calculate the offset, the system may subtract the base address of the selected memory segment from the memory address. In cases where the base address of the memory segment is zero or NULL, the memory address serves as an offset within the memory segment without any additional calculation.

Once the memory address is associated with the memory segment view, the system may attempt to access the data stored at the memory address by dereferencing the memory segment view (Operation 608). In particular, in response to a request to dereference the memory address using the memory segment view, the system may determine if the memory address is within the spatial and temporal bounds of the memory segment view associated with the memory address (e.g., the memory segment selected in Operation 604). If the memory address is within the bounds of the selected memory segment view, the dereference operation will complete successfully. If the memory address is outside the bounds of the selected memory segment, the system may generate an exception to the dereference operation.

In some embodiments, when the memory address is associated with the everything segment, dereference can happen without the need of creating any additional segment instances. This works because the everything segment is available as a constant. For example, consider the following code segment:

```
MemoryAddress addr = ... //obtain address from native code
int x =
MemoryAccess.getIntAtOffset(MemorySegment.ofNativeRestricted( ),
addr.toRawLongValue( ));
```

As shown above, once the memory address is obtained, the system can access the data stored at the memory address using the everything segment. Since the everything segment is available as a constant, the dereference operation can happen without the need of creating any additional segment instances or views of the everything segment. Moreover, since the everything segment has a base address of NULL, the memory address can be used directly as an offset into the everything segment, without a need to re-base the address. Because accessing the entire native heap (via the everything segment) is inherently unsafe, accessing the everything segment is considered a restricted operation which is only allowed after explicit opt in. for example, the user may set a runtime flag permitting restricted operations (e.g., the foreign.restricted=permit runtime flag in the Java language).

In this way, the system is able to dereference a received memory address, even when the memory address is not originally associated with a memory segment. Additionally, the use of unsafe operations is limited. Rather, the system is able to use safe operations to associate received memory address with known memory segments. Thus, dereferencing the received address, even if out of bounds, results in exceptions rather than unsafe memory accesses which could crash the system.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
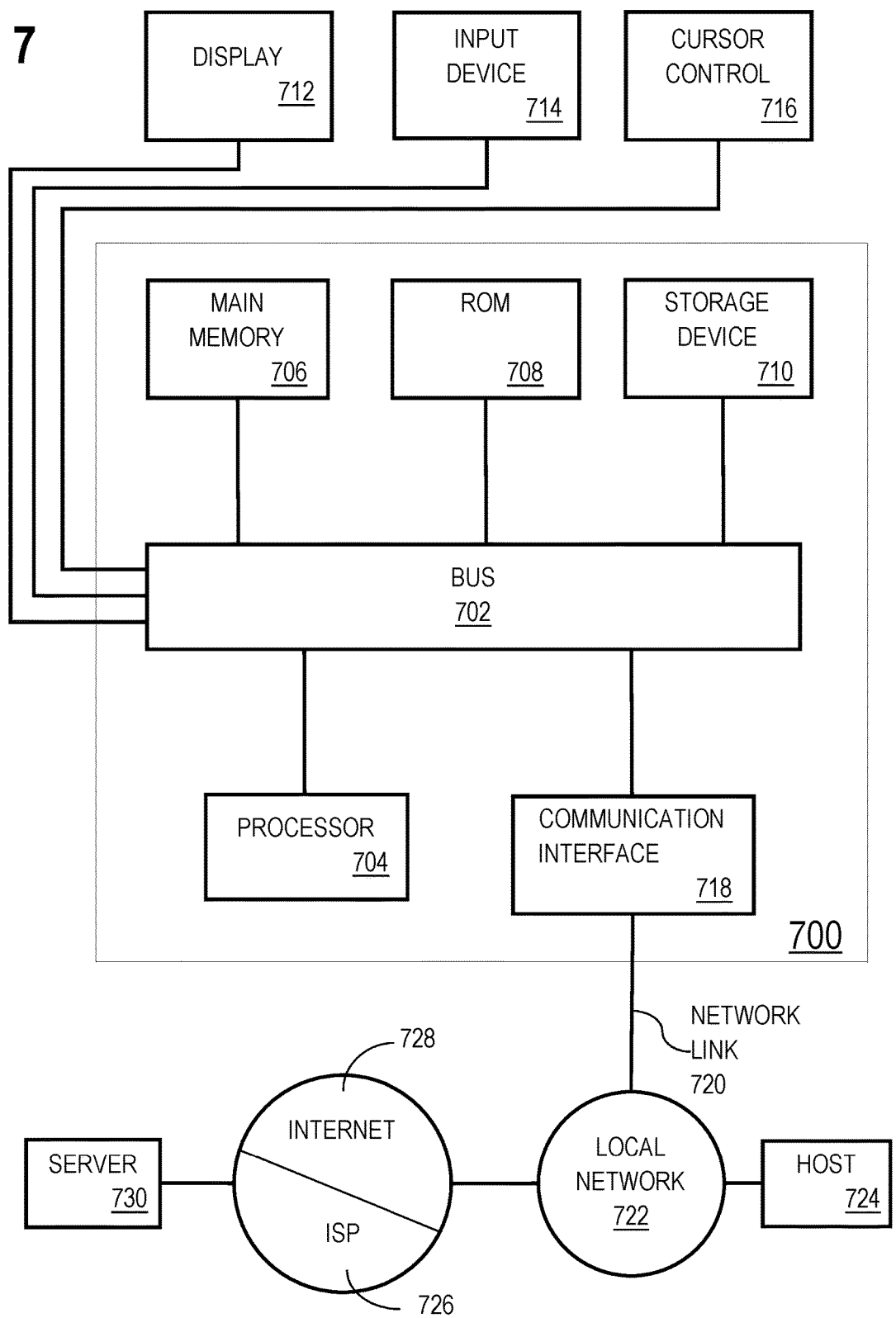
FIG. 7 illustrates a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
   receiving a memory address;
   determining that the received memory address is not associated with an existing memory segment;
   selecting a particular memory segment, from among a plurality of memory segments, that can be used for referencing the received memory address, wherein the particular memory segment is a known safe memory segment;
   associating the received memory address with the particular memory segment and determining an offset for the received memory address from a base address of the particular memory segment; and
   returning a reference to both (a) the particular memory segment and (b) the offset, from the base address of the particular memory segment, that corresponds to the received memory address.

2. The one or more media of claim 1,
   wherein associating the received memory address with the particular memory segment comprises creating a memory segment object that references the memory address and the particular memory segment; and
   wherein returning the reference to the particular memory segment comprises returning the memory segment object.

3. The one or more media of claim 1, wherein the memory segment is determined to be the known safe memory segment based on determining the spatial bounds of the memory segment correspond to memory addresses located in memory.

4. The one or more media of claim 1, wherein selecting the particular memory segment comprises:
creating a new memory segment based on received user input; and
selecting the new memory segment as the particular memory segment.

5. The one or more media of claim 4, wherein creating the new memory segment comprises rebasing the physical memory address using a base address of the particular memory segment.

6. The one or more media of claim 1, wherein the memory segment has a base address of zero and a size corresponding to a size of a native heap.

7. The one or more media of claim 1, wherein receiving the memory address comprises reading the memory address from a data structure implemented using native code.

8. The one or more media of claim 1, wherein receiving the memory address comprising receiving a return value from a native function.

9. The one or more media of claim 1, wherein determining that the received memory address is not associated with an existing memory segment comprises determining that the received memory address does not include a memory address object.

10. A method comprising:
receiving a memory address;
determining that the received memory address is not associated with an existing memory segment;
selecting a particular memory segment, from among a plurality of memory segments, that can be used for referencing the received memory address, wherein the particular memory segment is a known safe memory segment;
associating the received memory address with the particular memory segment and determining an offset for the received memory address from a base address of the particular memory segment; and
returning a reference to both (a) the particular memory segment and (b) the offset, from the base address of the particular memory segment, that corresponds to the received memory address,
wherein the method is performed by at least one device including a hardware processor.

11. The method of claim 10,
wherein associating the received memory address with the particular memory segment comprises creating a memory segment object that references the memory address and the particular memory segment; and
wherein returning the reference to the particular memory segment comprises returning the memory segment object.

12. The method of claim 10, wherein the memory segment is determined to be the known safe memory segment based on determining the spatial bounds of the memory segment correspond to memory addresses located in memory.

13. The method of claim 10, wherein selecting the particular memory segment comprises:
creating a new memory segment based on received user input; and
selecting the new memory segment as the particular memory segment.

14. The method of claim 13, wherein creating the new memory segment comprises rebasing the memory address using a base address of the particular memory segment.

15. The method of claim 10, wherein the memory segment has a base address of zero and a size corresponding to a size of a native heap.

16. The method of claim 10, wherein receiving the memory address comprises reading the memory address from a data structure implemented using native code.

17. The method of claim 10, wherein receiving the memory address comprising receiving a return value from a native function.

18. The method of claim 10, wherein determining that the received memory address is not associated with an existing memory segment comprises determining that the received memory address does not include a memory address object.

19. A system comprising:
at least one hardware processor;
the system being configured to perform operations comprising:
receiving a memory address;
determining that the received memory address is not associated with an existing memory segment;
selecting a particular memory segment, from among a plurality of memory segments, that can be used for referencing the received memory address, wherein the particular memory segment is a known safe memory segment;
associating the received memory address with the particular memory segment and determining an offset for the received memory address from a base address of the particular memory segment; and
returning a reference to both (a) the particular memory segment and (b) the offset, from the base address of the particular memory segment, that corresponds to the received memory address.

20. The system of claim 19,
wherein associating the received memory address with the particular memory segment comprises creating a memory segment object that references the memory address and the particular memory segment; and
wherein returning the reference to the particular memory segment comprises returning the memory segment object.

21. The system of claim 19, wherein the memory segment is determined to be the known safe memory segment based on determining the spatial bounds of the memory segment correspond to memory addresses located in memory.

22. The system of claim 19, wherein selecting the particular memory segment comprises:
creating a new memory segment based on received user input; and
selecting the new memory segment as the particular memory segment.

23. The system of claim 22, wherein creating the new memory segment comprises rebasing the memory address using a base address of the particular memory segment.

24. The system of claim 19, wherein the memory segment has a base address of zero and a size corresponding to a size of a native heap.

25. The system of claim 19, wherein receiving the memory address comprises reading the memory address from a data structure implemented using native code.

26. The system of claim 19, wherein receiving the memory address comprising receiving a return value from a native function.

27. The system of claim 19, wherein determining that the received memory address is not associated with an existing memory segment comprises determining that the received memory address does not include a memory address object.

* * * * *